Dec. 7, 1943.  D. L. LINDQUIST ET AL  2,336,106
MOTOR CONTROL SYSTEM
Filed Aug. 25, 1942  2 Sheets-Sheet 1

David Leonard Lindquist
Arthur Edward Handy  } INVENTORS
Jacob Daniel Lewis

BY *Hatt...Bradley*  ATTORNEY

Dec. 7, 1943.    D. L. LINDQUIST ET AL    2,336,106
MOTOR CONTROL SYSTEM
Filed Aug. 25, 1942    2 Sheets-Sheet 2

David Leonard Lindquist
Arthur Edward Handy    } INVENTORS
Jacob Daniel Lewis
BY Walter E. Bradley    ATTORNEY Patented Dec. 7, 1943

2,336,106

UNITED STATES PATENT OFFICE 2,336,106

MOTOR CONTROL SYSTEM

David Leonard Lindquist, Hartsdale, Arthur Edward Handy, Lynbrook, and Jacob Daniel Lewis, Yonkers, N. Y., assignors to Otis Elevator Company, New York, N. Y., a corporation of New Jersey Application August 25, 1942, Serial No. 456,300

8 Claims. (Cl. 172—152)

The invention relates to polyphase alternating current motor control systems, especially for elevators.

Where polyphase alternating current hoisting motors are employed in elevator installations, it is desirable to dynamically brake the motor for slowing down and to have a relatively slow speed at which the motor may be operated to enable the elevator car to be brought to an accurate stop at a floor.

It is the object of the invention to provide such a system.

The invention involves electrically locking the rotor of a polyphase alternating current hoisting motor in synchronism with the rotor of an intermediate auxiliary polyphase alternating current motor mechanically coupled with a second auxiliary motor for slowing down and for slow speed operation. The speed of the second auxiliary motor and the ratio of the number of poles of the intermediate auxiliary motor to that of the hoisting motor determine the speed of the hoisting motor. Slowing down of the hoisting motor is effected by the dynamic braking of the second auxiliary motor from the speed at which it is driven by the intermediate auxiliary motor at the time the latter is locked in synchronism with the hoisting motor until the desired slow speed of the hoisting motor is reached.

In carrying out the invention according to the arrangement which will be described, a polyphase alternating current induction motor with a wound rotor is utilized as the elevator hoisting motor, this motor being wound for the desired full speed operation. The rotor of the hoisting motor is connected to the wound rotor of an intermediate auxiliary polyphase alternating current induction motor. The rotor of the intermediate motor is mechanically coupled to the rotor of another auxiliary polyphase alternating current induction motor, which may be termed a driving motor. To start the car, the stators of both the hoisting motor and the intermediate motor are connected to the source of supply with the phase rotation of the voltage applied to the intermediate motor the same as that of the voltage applied to the hoisting motor. Resistance is connected across these rotors which is short-circuited for full speed operation of the hoisting motor, the intermediate motor running idly and driving the rotor of the driving motor. To slow down the car, the phase rotation of the voltage applied to the hoisting motor and intermediate motor is reversed which creates a powerful torque to lock their rotors in synchronism. The stator of the driving motor is then connected to the source for a phase rotation of its applied voltage to effect rotation of its rotor in the same direction as the rotor of the intermediate motor. The auxiliary motors are wound to provide a ratio of pole numbers such that this ratio times the synchronous speed of the hoisting motor equals the desired slow speed of the hoisting motor. As a result, when the connections are established for the driving motor, it is being driven at a multiple of its synchronous speed so that it is slowed down by dynamic braking. The driving motor is thus slowed down to its normal running speed and since the hoisting motor is locked in synchronism with the intermediate motor, the hoisting motor is slowed down to its slow speed. To start the car for operation at slow speed, all three motors are connected to the source, with the rotors of the hoisting motor and intermediate motor electrically connected to lock them in synchronism. The driving motor starts in operation and comes up to normal running speed, driving the intermediate motor and therefore the hoisting motor to bring it up to slow speed. Thus the speed of the driving motor determines the speed of the hoisting motor during slow down and slow speed operation.

Features and advantages of the invention will be apparent from the above statements, the description which follows and the appended claims.

Figure 1:
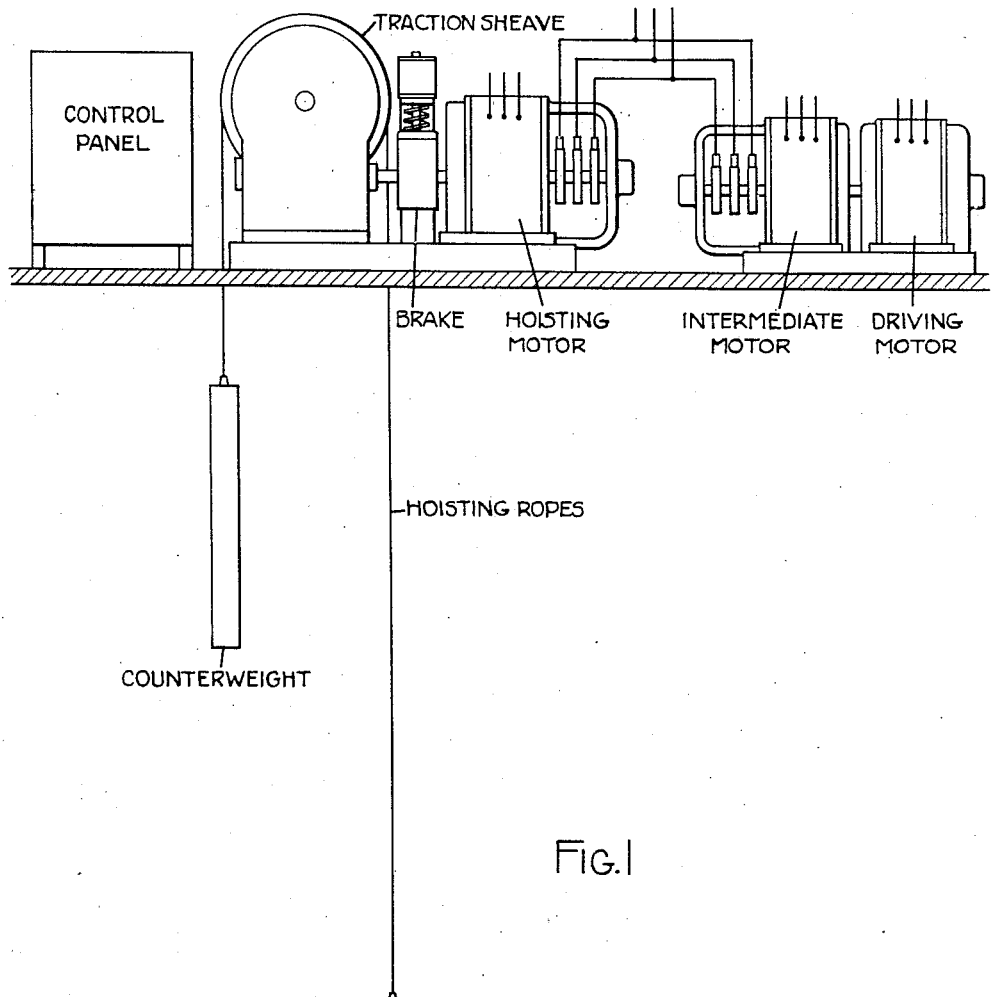
Figure 1 is a simplified schematic representation of an elevator installation in accordance with the invention.

Referring to Figure 1 wherein various parts of the system chosen to illustrate the invention are indicated by legend, the elevator car is raised and lowered by a polyphase alternating current hoisting motor. The rotor of the hoisting motor is electrically connected to the rotor of an auxiliary polyphase alternating current motor, designated intermediate motor. The rotor of the intermediate motor is in turn mechanically connected to the rotor of another auxiliary polyphase alternating current motor, designated driving motor. The hoisting motor acts through reduction gearing to rotate the traction sheave over which pass the hoisting ropes for the car and counterweight. An electromechanical brake is provided for bringing the car to rest after disconnection of the hoisting motor from the power supply lines. The electromagnetic switches utilized in the control system are mounted on the control panel. The invention will be described in connection with a car switch controlled installation, a car switch being indicated in the elevator car.

Figure 2:
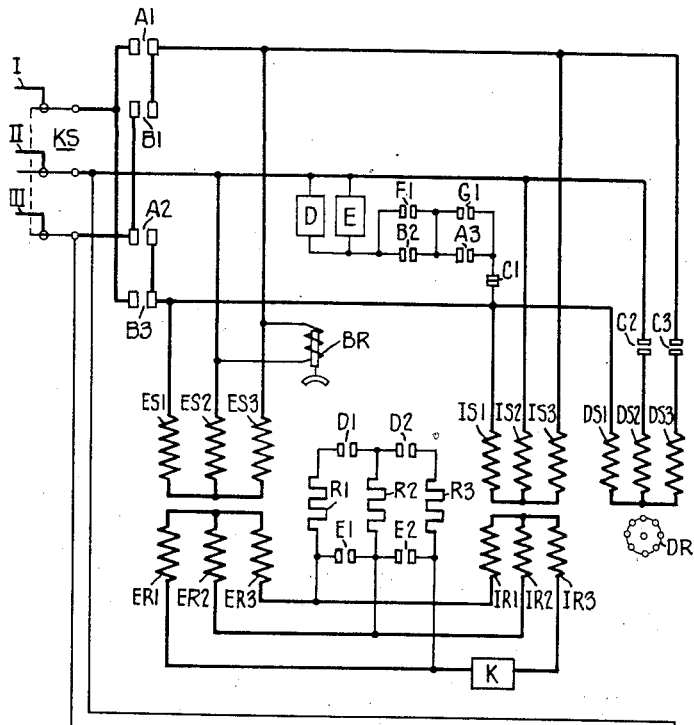
Figure 2 is a simplified wiring diagram in "across-the-line" form of a motor control system for elevators embodying the invention.
Figure 2:
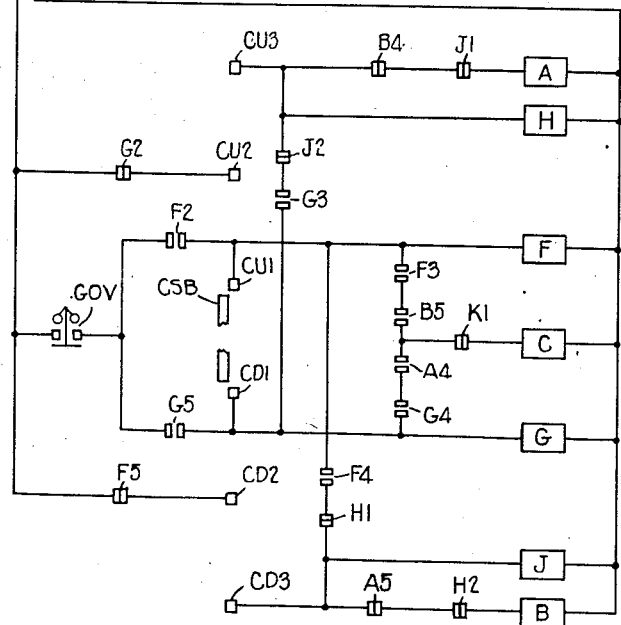
Figure 2S:
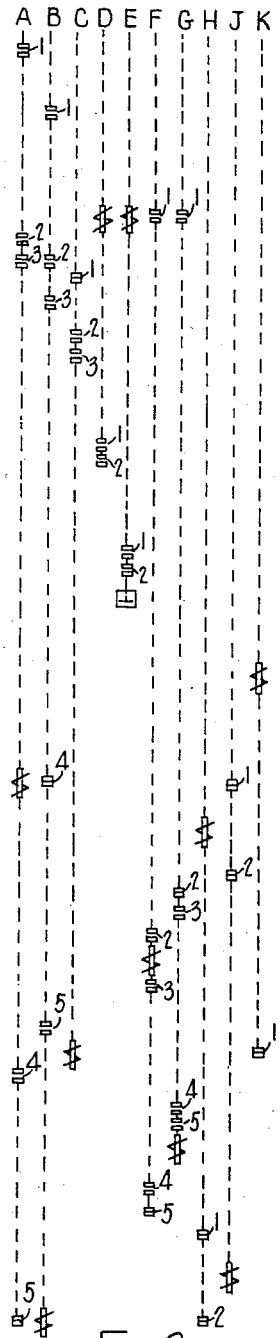
Figure 2s is a key diagram for Figure 2 showing the electromagnetic switches in spindle form with the contacts and coils arranged on the spindles in horizontal alignment with the corresponding contacts and coils in the wiring diagram.

Referring now to Figure 2, the control system has been considerably simplified. Such system has been chosen because it facilitates disclosure of an application of the invention. It is to be understood that other control elements and safety elements may be added in making up the system and that such system is subject to many variations. A three phase alternating current system has been illustrated, the supply lines of the alternating current source being designated I, II and III. KS is a triple pole knife switch for connecting the system to the supply lines. The stator windings of the hoisting motor are designated ES1, ES2 and ES3 while the rotor windings are designated ER1, ER2 and ER3. The stator windings of the intermediate auxiliary motor are designated IS1, IS2 and IS3 while the rotor windings of the intermediate motor are designated IR1, IR2 and IR3. The stator windings of the driving motor are designated DS1, DS2 and DS3 while the rotor of the driving motor is illustrated as a squirrel cage rotor designated DR. R1, R2 and R3 are resistances for the rotor circuits of the hoisting motor and intermediate motor. BR designates the release coil of the electromechanical brake. GOV designates a switch operated by a speed governor. CSB designates the bridging segment of the car switch while CU1, CU2 and CU3 are the up contacts of the car switch and CD1, CD2 and CD3 are the down contacts of the car switch.

The electromagnetic switches have been designated as follows:

A Up direction switch
    B Down direction switch
    C Driving motor control switch
    D First accelerating switch
    E Second accelerating switch
    F Up direction slow speed switch
    G Down direction slow speed switch
    H Up direction interlock relay
    J Down direction interlock relay
    K Synchronizing relay Throughout the description which follows, these letters will be applied to the coils of the above designated switches. Also, with reference numerals appended thereto they will be applied to the contacts of these switches as for example B3.

To start the car in the up direction the car switch is thrown into position where its bridging segment CSB bridges contacts CU1, CU2 and CU3. This completes a circuit through contacts G2 for the coils of switches A, H and F, the circuit for the coils of switches A and H being through car switch contacts CU2 and CU3 and the circuit for the coil of switch F being through car switch contacts CU2 and CU1. Up direction interlock relay H, upon operation, separates contacts H1 and H2 to prevent the energization of down direction interlock relay J and down direction switch B. Up direction switch A, upon operation, separates contacts A5 in the circuit for the coil of switch B and engages contacts A1 and A2 completing a circuit for the stator windings ES of the elevator hoisting motor and IS of the intermediate auxiliary motor. The phase rotation of the voltage applied to the stator windings of the elevator hoisting motor is for starting the car in the up direction. The stator windings of the intermediate auxiliary motor are subject to the same contacts of the reversing switch as those of the hoisting motor and are connected so that the voltages induced in the rotor windings of the intermediate motor are in the same phase sequence as the voltages induced in the rotor windings of the hoisting motor. The rotors of these motors being connected together without resistance connected thereto, neither motor is capable of developing any appreciable torque. However, the engagement of contacts A2, together with the engagement of contacts A3 and contacts F1 of the up direction slow speed switch F, completes a circuit for the coils of accelerating switches D and E. Switch E does not operate immediately, being delayed as by a dashpot. Switch D operates at once to engage contacts D1 and D2 connecting resistances R1, R2 and R3 across the rotors of the two motors, thus enabling these motors to develop torque. The engagement of contacts A1 also completes a circuit for the release coil of the electromechanical brake BR so that the brake is released and the car is started in the up direction, the intermediate auxiliary motor also starting in operation. Upon operation of switch E contacts E1 and E2 engage to short-circuit resistances R1, R2 and R3 to reduce the slip of the hoisting motor for full speed operation. The rotors of the hoisting motor and the intermediate motor are short-circuited by the operation of switch E so that each motor thereafter runs at a speed determined by its number of poles and its slip.

To slow down the car preparatory to stopping it at a landing, the car switch segment CSB is returned to neutral disengaging feed contact CU2. However, during starting of the car the governor switch GOV closed so that a circuit is maintained through contacts F2 for the coil of up direction slow speed switch F. Contacts F4 therefore remain closed so that, upon the dropping out of switches A and H to reengage contacts H1, H2 and A5, a circuit is completed for the coils of down direction switch B and down direction interlock relay J. Thus, upon the dropping out of up reversing switch A to separate contacts A1 and A2, down reversing switch B operates to engage contacts B1 and B3 completing a circuit for the stator windings of the elevator hoisting motor and intermediate auxiliary motor for reverse phase rotation of the applied voltage. Also the separation of contacts A3 breaks the circuit for the coils of accelerating switches D and E which are not reenergized owing to the fact that down direction slow speed switch G is not operated and contacts G1 remain separated. Thus at this instant resistances R1, R2 and R3 are not connected across the rotor windings of the hoisting motor and intermediate auxiliary motor so that both motors lose their torque. The reverse phase rotation of the voltage applied to the stator windings of these motors causes the voltages of the rotors of these motors to be substantially double line frequency and if out of phase electrically to develop a high synchronizing torque to pull into and lock these rotors in synchronism. The amount of current flow depends upon the amount which the rotors are out of phase electrically. Unless these rotors are already synchronized, the current flow is sufficient to cause the operation of synchronizing relay K which separates con-contacts K1 to prevent the energization of the coil of driving motor control switch C by the engagement of contacts B5 until the current is reduced sufficiently to permit switch K to drop out, at which time the rotors are locked in synchronism.

With contacts K1 engaged, the circuit is completed for the coil of driving motor control switch C through the governor switch GOV and contacts F2, F3, B5 and K1. Switch C, upon operation, separates contacts C1 in the circuit for the coils of accelerating switches D and E and engages contacts C2 and C3 to complete a circuit for the stator windings DS of the driving motor. During running of the elevator hoisting motor and therefore at the time the circuits for the stator windings of the driving motor are completed, the rotor of the driving motor is being driven by the intermediate motor at a speed determined by the number of poles of the intermediate motor. The pole numbers of the intermediate motor and driving motor are chosen so that the speed at which the driving motor is being driven is a multiple of its synchronous speed, disregarding slip. The stator windings of the driving motor are subject to the same reversing switch contacts (switch B at this time) as the stator windings of the elevator hoisting motor and intermediate motor and are connected for a phase rotation of applied voltage for rotating the rotor of the driving motor in the same direction as it is being driven by the rotor of the intermediate motor. Thus the driving motor is caused to slow down by dynamic braking, thereby slowing down the intermediate motor and, as the elevator hoisting motor is electrically locked in synchronism with the intermediate motor, also slowing down the elevator hoisting motor.

The governor switch GOV is set to open when the elevator hoisting motor is slowed down to the speed at which it runs when the driving motor nears synchronous speed. When this occurs the circuit for the coils of switches F, C, J and B is broken and these switches drop out. Switch B upon dropping out breaks the circuit for the stator windings of the hoisting motor, intermediate motor and the driving motor. It also breaks the circuit for the release coil of the electromechanical brake BR and the brake is applied to bring the car to a stop.

Operation of the car for downward travel is similar to that described for upward travel and will not be described in detail. Switches G, J and B are operated to start the car in the down direction. When the car switch segment is returned to neutral preparatory to stopping the car, switch G is maintained operated to cause operation of switches A and H. Also switch C operates after the rotors of the hoisting motor and intermediate motor have been locked in synchronism and contacts K1 are in engagement to complete the circuit of the stator windings of the driving motor. Owing to the fact that switch A is now operated to cause a phase rotation of the voltage applied to the driving motor for rotating the driving motor rotor in the same direction as it is being driven by the rotor of the intermediate motor, the driving motor is slowed down by dynamic braking. Thus the intermediate motor and therefore the elevator hoisting motor are slowed down. Upon opening of governor switch GOV, the circuits for the stator windings of these motors are broken and the brake is applied to bring the elevator car to a stop.

In the event that it is desired to operate the car at a slow speed, as for example to inch the car to a landing where an accurate stop has not been made, the car switch segment is moved only so far as to engage the feed contact for the particular direction of car travel desired. For example, if it be desired to inch the car upwardly, the segment is moved to engage contacts CU2 which completes a circuit for the coil of switch F which in turn completes a circuit for the coils of switches J and B. Switch B completes the circuits for the stator windings of the elevator hoisting motor and intermediate motor. If the rotors of these motors are not synchronized electrically, current flows between the rotors to pull them into synchronism during which time switch K is operated. When switch K drops back, contacts K1 reengage completing a circuit for the coil of switch C. Switch C completes the circuit for the stator windings of the driving motor for a phase rotation of applied voltage the same as that for slowing down the car for up car travel. The driving motor therefore starts in operation and comes up to normal running speed, rotating the rotor of the intermediate motor at the same speed. The rotor of the elevator hoisting motor being electrically locked to the rotor of the intermediate motor thus starts in the up direction and comes up to its slow running speed. The governor switch GOV does not operate at this speed so that upon centering the car switch segment as the landing level is reached, the circuit is broken for the coils of switches F, C, J and B. The dropping out of switch B deenergizes the stator windings of the elevator hoisting motor, intermediate motor and driving motor and deenergizes the brake release coil. Therefore, the brake is applied to bring the car to a stop.

To aid in an understanding of the invention, assume a three phase, 60 cycle, alternating current installation and that it is desired to have the elevator car operate at a running speed of 300 F. P. M. This may be readily accomplished using standard gearing and sheave with a polyphase alternating current hoisting motor wound for 8 poles to rotate at a synchronous speed of 900 R. P. M. By providing intermediate and driving motors with a ratio of pole numbers of say 1 to 9, a slow speed of 33 F. P. M. of the hoisting motor is obtained from which accurate stops may be readily made. It is preferred to provide an intermediate motor of low pole number as this minimizes the number of poles of the driving motor. By utilizing a 2 pole intermediate motor, the driving motor for a 1 to 9 ratio would have 18 poles. The synchronous speed of the intermediate motor would therefore be 3600 R. P. M., while that of the driving motor would be 400 R. P. M. At the instant the changeover is effected for slowing down the car, the intermediate motor (disregarding the slip of the hoisting motor) would therefore be driving the driving motor at 3600 R. P. M. or nine times the synchronous speed of the driving motor. As a result, the driving motor would be dynamically braked to slow down to its synchronous speed of 400 R. P. M. The speed of the hoisting motor at any instant during this slow down period is the ratio of the pole numbers of the intermediate motor and the hoisting motor times the speed of the driving motor, in the present assumption $\frac{2}{8}$ of the driving motor speed. Thus when the driving motor speed becomes 400 R. P. M. the hoisting motor speed becomes 100 R. P. M. or ⅑ of the synchronous speed of the hoisting motor. Thus the speed of the car is reduced to ⅑ of its running speed or 33 F. P. M. In restarting the car to inch it to the floor in case the stop is not accurate enough, the driving motor upon starting comes up to a speed of 400 R. P. M. causing a hoisting motor speed of 100 R. P. M. and a car speed of 33 F. P. M.

It is to be understood that the invention is applicable to installations of other running speeds and for different ratios of full speed and slow speed of the elevator car. Also, the various motors may have other pole numbers than those given in the example, and other types of motors may be utilized for the driving motor, for example a direct current motor. Although the invention has been described as applied to a car switch controlled elevator system, it is applicable to other forms of control including those in which the stopping of the car is automatic, as for example in push button controlled systems.

Many elevator control systems are very complex and admit of many variations. In applying the invention to such control systems changes may be made with the view of adapting the invention more readily to such systems. Other changes may also be made which do not depart from the spirit and scope of the invention. The invention may be applied to other than elevator systems. It is therefore intended that all matter contained in the above description and shown in the accompanying drawings shall be interpreted as illustrative and not in a limiting sense.

What is claimed is:

1. In combination; a polyphase alternating current work motor having a wound rotor; a source of polyphase alternating current for said motor; means connecting said motor to said source for fast speed operation thereof; a pair of auxiliary polyphase alternating current motors having mechanically coupled rotors, one of which has a wound rotor and is of a lower pole number than the other; and means connecting all of said motors to said source, with the rotors of said work motor and said one auxiliary motor electrically connected to lock them in synchronism and with the connection of said other auxiliary motor for rotating said one auxiliary motor and therefore said work motor in a given direction, for slow speed operation of said work motor.

2. In combination; a polyphase alternating current work motor of a given pole number and having a wound rotor; a source of polyphase alternating current; means for connecting said motor to said source for fast speed operation thereof; an intermediate auxiliary polyphase alternating current motor of a lower pole number than said work motor and having a wound motor; a second auxiliary polyphase alternating current motor mechanically coupled to said intermediate motor and of a higher pole number than said intermediate motor; and means for connecting all of said motors to said source with the rotors of said work motor and said intermediate motor electrically connected to lock them in synchronism, for slowing down said work motor.

3. In combination; a polyphase alternating current work motor having a wound rotor; an auxiliary polyphase alternating current motor having a wound rotor electrically connected to the rotor of said work motor; a source of polyphase alternating current for said motors; means connecting said motors to said source to cause operation thereof for fast speed running of said work motor; a second auxiliary polyphase alternating current motor mechanically coupled to said first auxiliary motor and of a higher number of poles than said first auxiliary motor; and means for locking said work motor and first auxiliary motor in synchronism and for connecting said second auxiliary motor to said source for rotation in the same direction as said first auxiliary motor, for slowing down said work motor.

4. In combination; a polyphase alternating current work motor having a wound motor; an auxiliary polyphase alternating current motor having a wound rotor electrically connected to the rotor of said work motor; a source of polyphase alternating current for said motors; means connecting said motors to said source to cause operation thereof; a third motor mechanically driven by said auxiliary motor; and means for locking said auxiliary motor and said work motor in synchronism and for causing dynamic braking of said third motor to slow down said work motor.

5. In combination; a polyphase alternating current work motor having a wound rotor; an auxiliary polyphase alternating current motor having a wound rotor electrically connected to the rotor of said work motor; a source of polyphase alternating current for said motors; means connecting said motors to said source to cause operation thereof; means for causing said motors to be locked in synchronism; a second auxiliary polyphase alternating current motor mechanically driven by said first auxiliary motor; and means operable when said work motor and first auxiliary motor are locked in synchronism for connecting said second auxiliary motor to said source for rotation in the same direction as it is driven by said first auxiliary motor, said first auxiliary motor having a lower pole number than said second auxiliary motor to cause dynamic braking of said second auxiliary motor to slow down said first auxiliary motor and therefore said work motor.

6. In combination; a polyphase alternating current hoisting motor having a wound rotor; an auxiliary polyphase alternating current motor having a wound rotor electrically connected to the rotor of said hoisting motor; a source of polyphase alternating current for said motors; means connecting the stator windings of said motors to said source and short-circuiting said rotors for operation of said motors with the connections such that the voltages induced in the rotors are in the same phase sequence; means for removing said short circuit from said rotors and for reversing the phase rotation of the voltages applied to said motors to cause locking of their rotors in synchronism; a second auxiliary polyphase alternating current motor having its rotor mechanically connected to the rotor of said first auxiliary motor; and means operable when said rotors of said hoisting and first auxiliary motors are locked in synchronism for connecting the stator windings of said second auxiliary motor to said source for rotation of said second auxiliary motor in the same direction as it is being driven by said first auxiliary motor, said first auxiliary motor having a lower pole number than said second auxiliary motor to cause dynamic braking of said second auxiliary motor to slow down said first auxiliary motor and therefore said hoisting motor.

7. In combination; an elevator car; a polyphase alternating current hoisting motor for the car, said motor having a wound rotor; an intermediate auxiliary polyphase alternating current motor having a wound rotor electrically connected to the rotor of said hoisting motor; a source of polyphase alternating current for said motors; resistance; means connecting the stator windings of said motors to said source and said resistances across their rotors to start the car, the stator windings of said intermediate motor being connected to cause the same phase sequence of the voltages induced in its rotor as that of the voltages induced in the rotor of the hoisting motor; means for short-circuiting said rotors for full speed operation of the car, said hoisting motor being of a pole number to give the desired running speed of the car; means for removing said short circuit for said rotors and disconnecting said resistance therefrom and for reversing the phase rotation of the voltages applied to the stator windings of said motors to cause locking of their rotors in synchronism; an auxiliary polyphase alternating current driving motor having its rotor mechanically coupled to the rotor of said intermediate motor; and means responsive to the locking of said rotors of said hoisting and intermediate motors in synchronism for connecting the stator windings of said driving motor to said source, said driving motor being of a high pole number and said intermediate motor being of a low pole number and the connections of the stator windings of said driving motor being for rotating that motor in the same direction it is being driven by said intermediate motor, whereby upon connection of said driving motor to its source it is dynamically braked, slowing down said intermediate motor and therefore slowing down said hoisting motor to a speed which is to the synchronous speed of the hoisting motor as the pole number of said intermediate motor is to the pole number of the driving motor.

8. In combination; an elevator car; a three phase alternating current hoisting motor for the car, said motor having a wound rotor; an intermediate auxiliary three phase alternating current motor having a wound rotor electrically connected to the rotor of said hoisting motor; a source of three phase alternating current for said motors; resistance; means connecting the stator windings of said motors to said source and said resistance to their rotors to start the car, the stator windings of said intermediate motor being connected to cause the same phase sequence of the voltages induced in its rotor as that of the voltages induced in the rotor of the hoisting motor; means for short-circuiting said resistance to short-circuit said rotors for full speed operation of the car, said hoisting motor being of a pole number to give the desired running speed of the car; means for removing said short circuit for said rotors and disconnecting said resistance therefrom and for reversing the phase rotation of the voltages applied to the stator windings of said motors to cause locking of their rotors in synchronism; an auxiliary three phase alternating current squirrel cage driving motor having its rotor mechanically coupled to the rotor of said intermediate motor; means responsive to the locking of said rotors of said hoisting and intermediate motors in synchronism for connecting the stator windings of said driving motor to said source, said driving motor being of a high pole number and said intermediate motor being of a low pole number so that the rotor of said driving motor is driven at a multiple of its synchronous speed and the connections of the stator windings of said driving motor being for rotating that motor in the same direction it is being driven by said intermediate motor, whereby upon connection of said driving motor to its source it is dynamically braked, slowing down said intermediate motor and said hoisting motor, the ratio of the pole numbers of said intermediate motor and driving motor being such as to cause slow down of the elevator car to a desired slow speed as the driving motor speed is reduced to normal running speed; an electromechanical brake for stopping the car; and means responsive to a decrease in speed of the hoisting motor to a certain value for disconnecting all of said motors from said source and for causing application of said brake to bring the car to a stop.

DAVID LEONARD LINDQUIST.
ARTHUR EDWARD HANDY.
JACOB DANIEL LEWIS.